United States Patent [19]
Glover et al.

[11] 3,962,924
[45] June 15, 1976

[54] DOUBLE CAM DRIVE FOR A HEDGE TRIMMER HAVING TWO RECIPROCATING CUTTING BLADES

[75] Inventors: Richard Warmath Glover, Joppa; Edward Joseph Oldewurtel, Columbia, both of Md.

[73] Assignee: The Black and Decker Manufacturing Company, Towson, Md.

[22] Filed: Jan. 10, 1975

[21] Appl. No.: 539,971

Related U.S. Application Data

[62] Division of Ser. No. 463,749, April 24, 1974, Pat. No. 3,897,630.

[52] U.S. Cl. ................................................. 74/50
[51] Int. Cl.² ...................................... F16H 21/18
[58] Field of Search ........................................ 74/50

[56] References Cited
UNITED STATES PATENTS

| | | | |
|---|---|---|---|
| 2,787,111 | 4/1957 | Templeton | 74/50 |
| 3,374,683 | 3/1968 | Jesse | 74/50 |

*Primary Examiner*—Samuel Scott
*Assistant Examiner*—Wesley S. Ratliff, Jr.
*Attorney, Agent, or Firm*—Edward D. Murphy; Leonard Bloom

[57] ABSTRACT

A hedge trimmer having two counter reciprocating cutting blades, each of the blades having a yoke at one end defining a cam follower slot, the cutting blades being held together by mounting means which hold the yokes in close face-to-face contact, and a double cam drive engageable with the cam follower slots, the double cam drive being so designed that one cam cannot interfere with the cam follower slot which is adapted to be engaged by the other cam. The cams are so positioned with respect to each other that the periphery of one cam entirely surrounds the periphery of the other cam. The cams, which are circular, are mounted upon one side of a drive member with the axes of the two cams lying on opposite sides of the axis of the drive member. Preferably the axis of one of the cams is spaced further away from the axis of the drive member than the other cam member, this cam engaging a cutting blade of lower mass than the other cutting blade in order to counterbalance the inertial forces created by the reciprocating cutting blades. Alternatively, the blades may be of equal mass and the axial spacing of the cams equal to achieve counterbalance.

7 Claims, 11 Drawing Figures

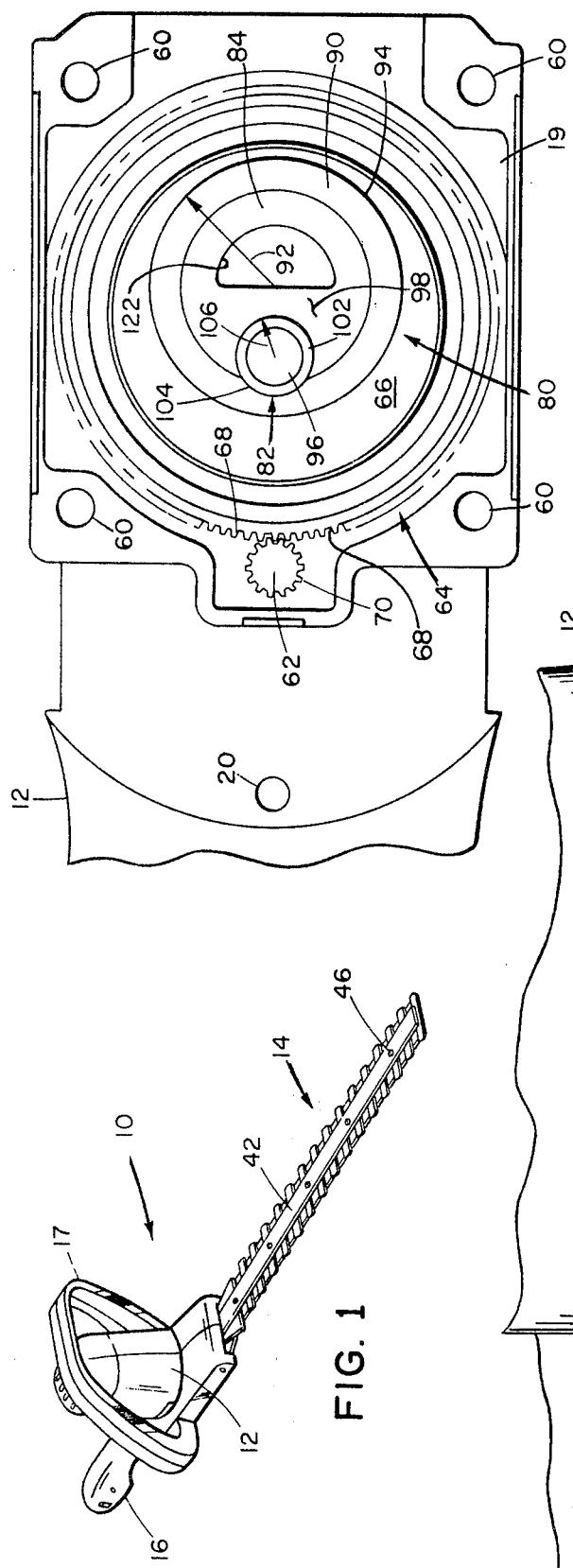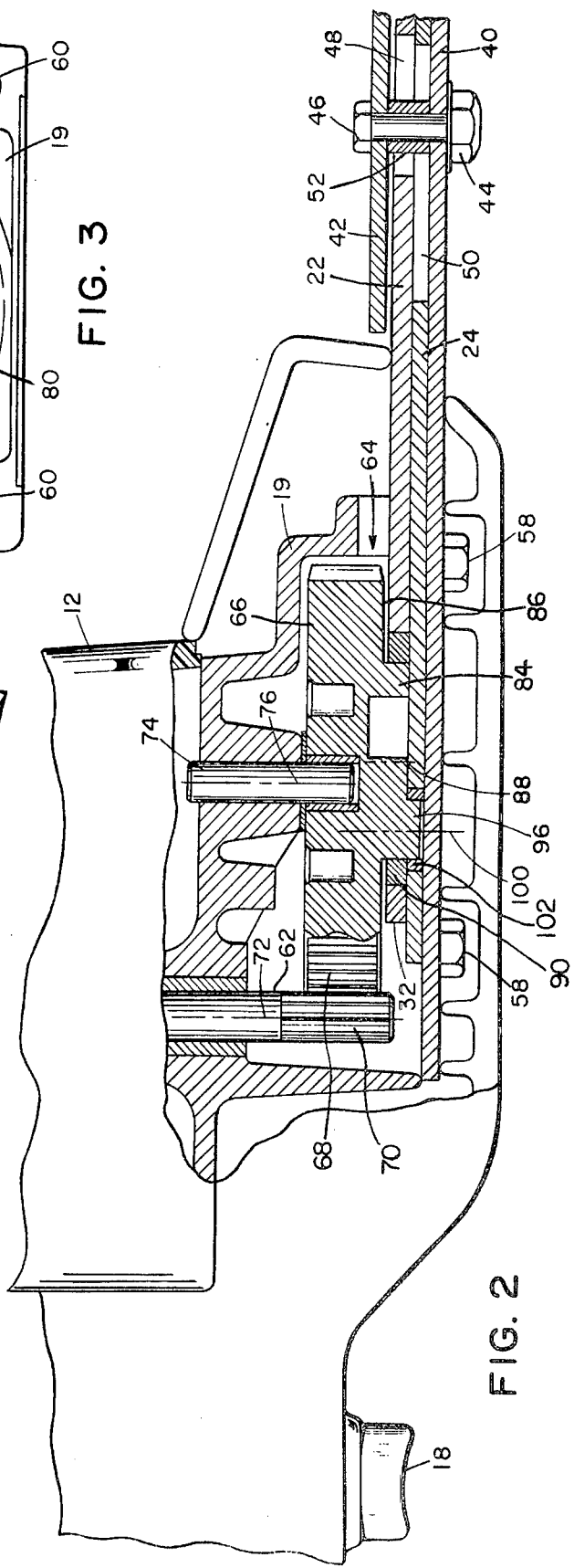

DOUBLE CAM DRIVE FOR A HEDGE TRIMMER HAVING TWO RECIPROCATING CUTTING BLADES

This is a division of application Ser. No. 463,749, filed Apr. 24, 1974, now U.S. Pat. No. 3,897,630.

FIELD OF THE INVENTION

The present invention relates generally to hedge trimmers or the like which have two movable driven cutting members in which a double cam drive is used to engage cam follower slots in the driven cutting members which are held in face-to-face contact, the double cam drive being of such a design that one of the cams cannot interfere with the cam follower slot adapted to be engaged by the other cam.

BACKGROUND OF THE INVENTION

In hedge trimmers and similar applications having reciprocating cutting members it is common practice to impart reciprocal motion to the cutting member by means of a scotch yoke drive mechanism. Thus, the cutting member is provided with a yoke portion having a cam follower slot, and a circular cam, which is eccentrically mounted upon a drive member, engages the yoke to impart reciprocal motion to the cutting member upon rotation of the drive member. When two reciprocal shear bars are employed it has been proposed in the past to employ such a drive mechanism, and one such example is shown in U.S. Pat. No. 2,630,628 issued Mar. 18, 1953. In the drive shown in this patent two juxtapositioned cams engage cam follower slots into juxtapositioned yokes. However, the drive shown in this patent is not satisfactory as during operation of the cutting devices, forces are imposed upon the cutting members which tend to move the yokes out of their normal plane of operation along the axis of the drive member. If these forces are along the as one cam is passing the cam follower slot which is adapted to be engaged by the other cam it is possible for the first cam to interfere or engage with the other cam follower slot which may result in the parts locking and/or breaking. Repeated interference will eventually cause a breakdown of the parts.

In view of the deficiencies shown in the aforesaid patent design it has been proposed to separate the yokes so they are not in face-to-face contact. In accordance with one design the yokes are offset from the principal plane of the cutting members and are engaged by cams disposed on opposite sides of the driving member. While the foregoing design is generally satisfactory it is somewhat costly, particularly since it is necessary to provide the cutting members with offset yokes. This is not considered desirable in the design of the cutting members as forces to the cutting members are transmitted from the cam follower slot in the yoke in shear through the offset portion requiring either reinforcement at the point of offset or requiring higher strengths and thicknesses of materials to be employed in the overall design of the cutting member. Alternatively it has been proposed to mount both of the cams on one side of a drive member, the cams being separated from each other by a spacing shim which extends between the yokes of the driven members. While this design is generally satisfactory, it is desirable to simplify the design by eliminating the requirements of a spacing shim.

OBJECTS AND SUMMARY OF THE INVENTION

It is a principal object of the present invention to provide a double cam drive for hedge trimmers or the like having two reciprocating cutting bars or blades, the cams engaging cam follower slots in juxtapositioned yokes, the cam design being such that one cam will not interfere with the cam follower slot adapted to be engaged by the other cam.

More specifically, it is an object of the present invention to provide a double cam drive for two juxtapositioned driven members having cam follower slots, the cams being eccentrically mounted upon one side of a driving member, the axis of rotation of the drive member passing within the periphery of one of the cams, and the periphery of the second cam lying entirely within the periphery of the first cam.

It is a further object of the present invention to provide two driven members having juxtapositioned yokes defining cam follower slots, the first circular cam being mounted upon a drive member and having a radius in excess of its throw, and the second cam member being mounted adjacent the first cam member and eccentric to said drive member, the maximum distance between the outer periphery of the second circular cam member and the axis of the drive member being not greater than the difference between the radius of the first cam member and its throw.

It is an additional object of the present invention to provide a portable hand carried hedge trimmer or the like having two driven blades, the mass of one blade being greater than the mass of the other blade, and the blades having juxtapositioned yokes defining cam follower slots, and a double cam drive assembly including a first circular cam member mounted on one side of a drive member with its center to one side of the axis of rotation of the drive member, and a second circular cam member mounted on the first cam member with its center to the opposite side of the axis or rotation of the drive member, the distance between the center of the second circular cam member and the axis of rotation of the drive member being greater than the distance between the center of the first circular cam member and the axis or rotation of the drive member, and the second cam lying entirely within the periphery of the first cam, the second cam engaging the shear blade having lower mass so that during the operation of the hedge trimmer or the like the inertial forces created by the unbalanced shear bars will be counterbalanced.

These and other objects and advantages of this invention will be apparent to those skilled in the art after a consideration of the following detailed description, taken in conjunction with the accompanying drawings in which preferred forms of this invention are illustrated.

BRIEF DESCRIPTION OF THE DRAWINGS

FIG. 1 is a perspective view of a hedge trimmer in which the principles of the present invention are incorporated.

FIG. 2 is a side view of the hedge trimmer shown in FIG. 1, a portion of the hedge trimmer being shown in section.

FIG. 3 is a bottom view of the hedge trimmer shown in FIG. 1 with the shear blade assembly being removed and portions of the housing and handles being broken out.

FIG. 7 showing one of the shear blades all the way to the left and the other all the way to the right, FIGS. 8 and 9 showing two progressive intermediate positions, and FIG. 10 showing the blades in their opposite positions from FIG. 7, the cams being shown in broken lines in these various Figures.

DESCRIPTION OF THE PREFERRED EMBODIMENTS

Figure 4:
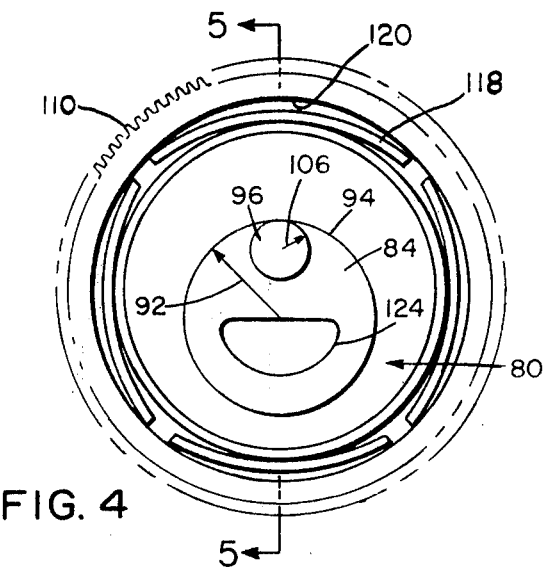
FIG. 4 is a bottom view of a clutched drive member having a slightly modified cam for driving the shear blade assembly.

Referring first to FIGS. 1 and 2, the principles of the present invention are incorporated in an apparatus in the form of a portable power tool or hedge trimmer indicated generally at 10. The hedge trimmer includes a housing 12 and a shear blade assembly indicated generally at 14. The hedge trimmer shown in these drawings is of the type having an electric motor mounted within the housing, the motor receiving its power from an external power source through a line cord. However, it should be appreciated that the motor could be battery driven. The hedge trimmer is provided with two support handles 16 and 17, there being a switch 18 (FIG. 2) mounted in the handle 16 for controlling the operation of the motor. The housing 12 includes a mounting casing 19 which is secured to other portions of the housing 12 by screws 20, one of which is shown in FIG. 3.

Figure 11:
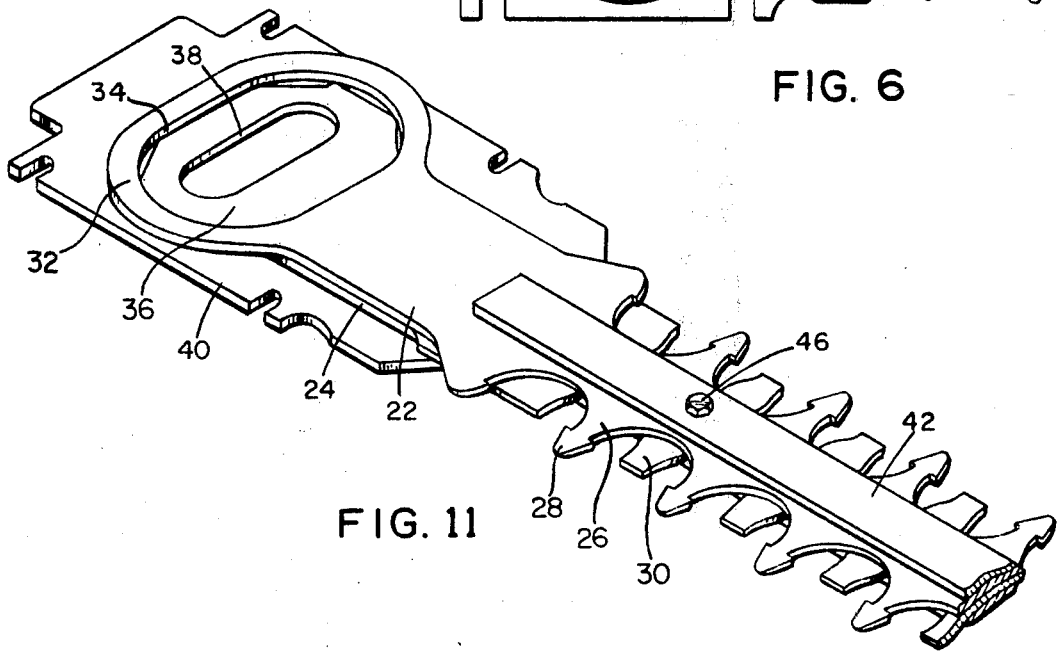
FIG. 11 is a perspective view of the shear blade assembly.

Referring now to FIGS. 2 and 11, the shear blade assembly includes first and second driven members and support means for mounting the driven members, the driven members being elongated shear bars or driven cutting blades 22, 24. The shear bar 22 is a driven combing blade having a plurality of outwardly extending teeth 26 provided with combing projections 28. The shear bar 24 is referred to as a driven shear blade and has outwardly projecting teeth 30. The mass of the combing blade 22 is greater than the mass of the shear blade 24 due to its greater thickness and also due to the addition of the combing projection 28. Each of the blades 22, 24 is provided with a yoke at one end which defines a cam follower slot that extends transversely to the length of the blade, the yoke for the combing blade 22 being indicated at 32, the cam follower slot of the combing blade being indicated at 34, the yoke of the shear blade being indicated at 36 and the cam follower slot of the shear blade being indicated at 38. The support means mounts the driven blades for opposed reciprocal movement in a plane about their length, the support means also holding the yokes in face-to-face or juxtapositioned relationship with respect to each other. The support means includes a mounting plate 40 disposed below the driven blade 24 and a cover plate 42 disposed to the other side of blade 22. The support means further includes fastener means in the form of nuts 44 and bolts 46 which pass through elongated apertures 48, 50 in the combing blade 22 and shear blade 24, respectively. In order to provide for reciprocal movement of the blades between the cover plate 42 and the mounting plate 40, spacers 52 are provided, the spacers having a length slightly in excess of the combined thicknesses of the blades 22, 24. One end 54 of the mounting plate 40 extends beyond the yokes 32, 36, the end 54 being provided with slots or apertures 56 which are adapted to receive cap screws 58 for the purpose of mounting the shear blade assembly to the housing 11, the cap screws 58 being received within the threaded apertures 60 (FIG. 3) on the mounting casting 19.

Drive means are mounted within the housing 12 for driving the driven blades 22, 24, in such a manner that they reciprocate in opposite directions relative to each other about their length. The drive means includes the output shaft 62 of the motor mounted within the housing, and a drive member or gear means indicated generally at 64 in FIG. 2. The drive member 64 in this embodiment is a gear 66 having teeth 68 which mesh with teeth 70 formed on the output shaft 62 of the motor. The output shaft of the motor rotates about an axis (indicated by the broken line 72) which is normal to the plane of reciprocation of the blades 22, 24. Similarly, the gear 66 is mounted for rotation about a stub shaft 74 for rotation about an axis (indicated by the broken line 76) which is also normal to the plane of reciprocation of the blades 22, 24, the axis of rotation 76 for the gear 66 being parallel to the axis of rotation 72 of the output shaft 62.

A double cam drive is provided for engaging the cam follower slots on the blades 22, 24, the double cam being driven by the drive member 66 in such a manner that the blades reciprocate in opposed directions. The double cams include a first cam means indicated generally at 80 and second cam means indicated generally at 82, both in FIG. 3. The first cam means 80 includes a circular projection forming a cam member 84 formed integrally on the bottom surface 86 of the gear 66. The cam member has its center, indicated by the line 88 in FIG. 2 disposed to one side of the axis of rotation 76 of the drive member 66. The first cam means in addition includes a bearing washer 90 journalled about the cam member 84 and the exterior of the washer 90 defines the periphery 94 of this first cam means. The radius of the first cam means, indicated by the arrrow 92 in FIG. 3 is in excess of the throw of the first cam means. The throw of the first cam is the distance between its center 88 and the axis of rotation 76 of the drive member 66. It should be appreciated that since the radius of the first cam means is greater than its throw that the axis of rotation 76 of the drive member will pass within the periphery 94 of the first cam means.

The second cam means includes a second circular projection forming a cam member 96 which extends outwardly from that face 98 of the first circular projection 84 which is disposed away from the surface 86 of the drive member. The center of the second cam member, which is indicated by the broken line 100 in FIG. 2, is in line (in a horizontal plane) with the axis of rotation 76 of the drive member and the center 88 of the first cam member with the axis of rotation 76 being disposed between the centers 88 and 100 of the first and second cam members 84, 96, respectively. The second cam means also includes a bearing washer 102 which is journalled about the cam member 96 and the exterior of the washer 96 defines the periphery 104 of this second cam means. The first and second cam means are so dimensioned that the maximum distance between the outer periphery 104 of the second cam means and the axis of rotation 76 of the gear is not more than the difference between the radius 92 of the first circular cam means and its throw. Thus, the outer periphery 104 of the second cam means lies entirely within the outer periphery 94 of the first cam means.

Figure 6:
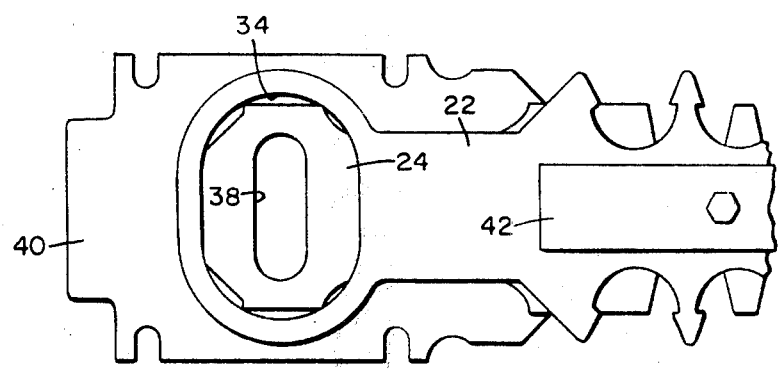
FIG. 6 is a top view of a portion of the shear blade assembly with the juxtapositioned yokes being disposed in their intermediate position, the cams which engage the cam follower slots being shown in broken lines.
Figure 7:
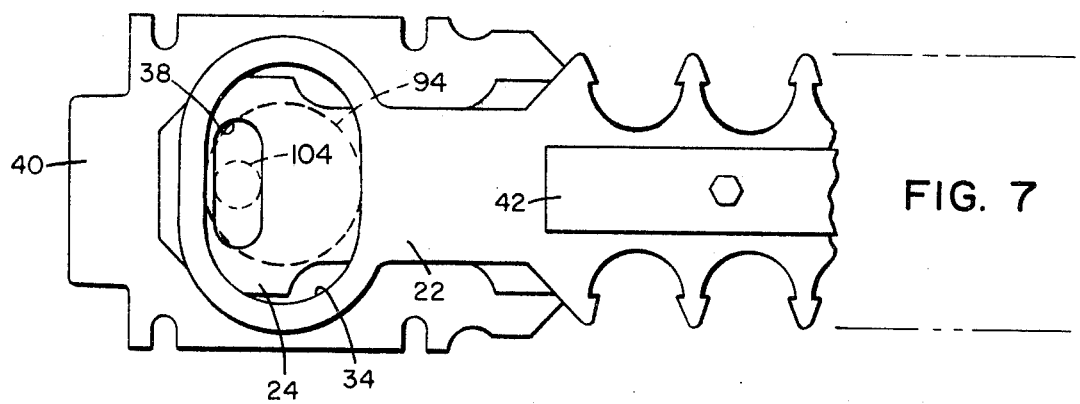
FIGS. 7, 8, 9, 10 are views illustrating the juxtapositioned yokes of the two shear blades with the shear blades being shown in different positions of reciprocation.
Figure 8:
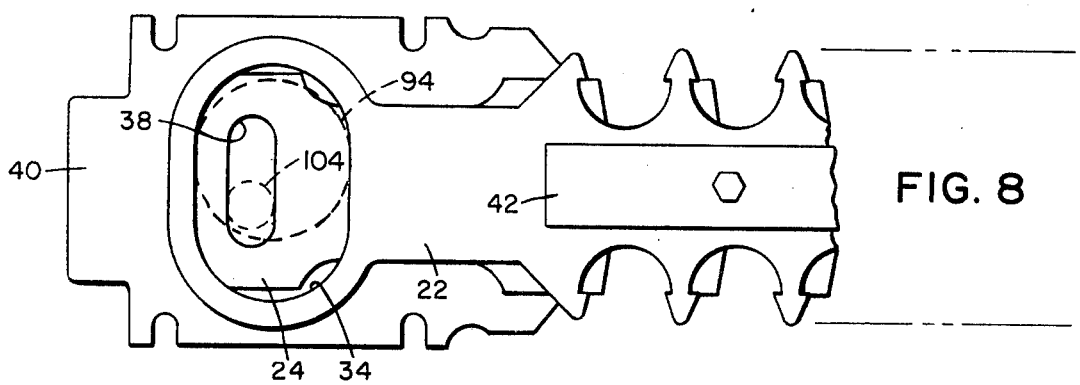
Figure 9:
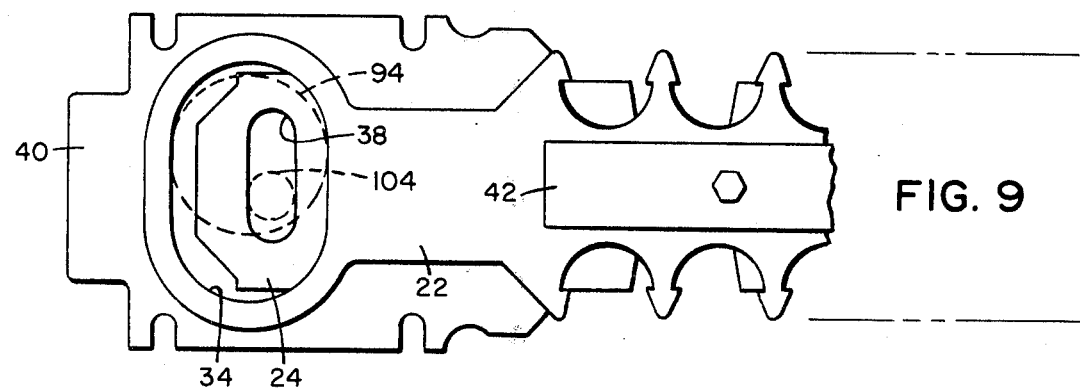
Figure 10:
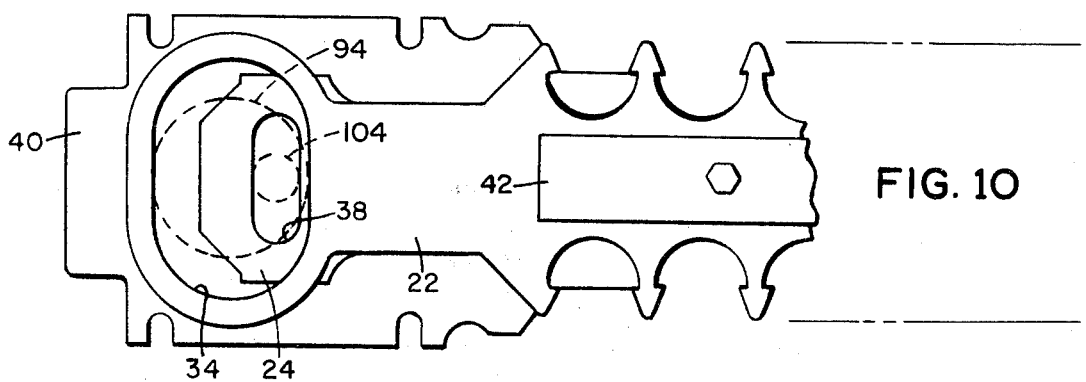

The periphery 94 of the first cam means engages the cam follower slot 34 on the driven combing blade 32 and is operable upon rotation of the gear 66 to impart reciprocal motion to the combing blades. Similarly, the periphery 104 of the second cam means engages the cam follower slot 38 on the driven shear blade and is operable to impart reciprocal motion to the driven shear blade upon rotation of the gear means. The reciprocal motion of the driven blades are opposed to each other as each of the cam means is disposed on opposite sides of the center of rotation of the gear members. By dimensioning the first and second cam means in such a manner that the second cam means lies entirely within the periphery of the first cam means it is not possible for one cam to interfere with the cam follower slot which is adapted to receive the other cam means. This feature can best be appreciated from an inspection of FIGS. 6 through 10. In FIG. 6 the blades 22, 24 are shown in an intermediate position where the center of the cam follower slots overlie each other, a line passing through the centers of the cam means being transverse to the direction of reciprocation of the blades. FIGS. 7 and 10 show the positions of the cam means and cam follower slots when the blades are at their extreme positions of movement, FIG. 7 showing the combing blade all the way to the right and the shearing blade 24 all the way to the left. Similarly, FIG. 10 shows the shear blade all the way to the right and the combing blade all the way to the left. FIGS. 8 and 9 show intermediate positions, the position shown in FIG. 8 lying somewhat between the positions shown in FIGS. 6 and 7, and the position shown in FIG. 9 lying somewhere between the position shown in FIGS. 6 and 10. It can be appreciated that at no point can the second cam means engage the cam follower slot which is adapted to be engaged by the first cam means as at all times the second cam means lies entirely within the cam follower slot adapted to be engaged by the first cam means. Similarly, it is not possible for the first cam means to engage the cam follower slot 38 which is adapted to be engaged by the second cam means as at all times the cam follower slot 38 lies within the periphery of the first cam means. Thus, even though the blades will be subjected to vertical deflection, it is not possible for one cam means to interfere with the cam follower slot that is adapted to be engaged by the other cam means.

Figure 5:
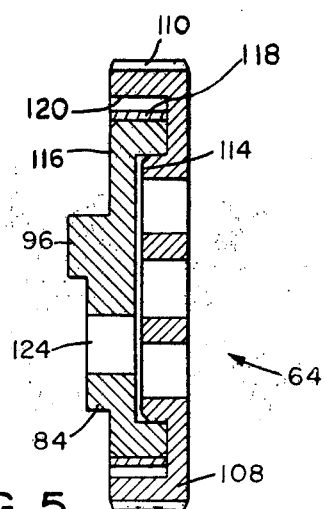
FIG. 5 is a section taken along lines 5—5 in FIG. 4.

In FIGS. 4 and 5 a slightly modified gear means and cam assembly is illustrated. The gear means shown in these FIGS. includes a gear 108 having teeth 110 on its outer periphery, the gear 108 being provided with a circular recess 112 about a hub portion 114. An intermediate drive member 116 is journalled about the hub 114, the intermediate member being driven by the gear through clutch elements 118 having intermediate portions which bear against the outer periphery of the intermediate member and end portions which bear against the outer wall 120 of the recess 112, the clutch elements being formed of resilient steel or the like. The cam means are formed on the bottom surface of the intermediate member 116 and correspond to the cams described above in their dimensional relationships, however, the cam means do not include the bearing washers of the preceding embodiment. The portions of the cam means of this embodiment which are common to the previously described embodiment are designated by the same reference numerals. In this embodiment the periphery 94 of the first circular projection 84 would bear directly against the cam follower slot 34 of the blade 32. Similarly, the periphery 104 of the second projection 96 would bear directly against the cam follower slot 38 of the blade 24. The relationship of the cam means to the cam follower slots would be substantially the same as the relationships illustrated in FIGS. 6–10.

In the previous example of FIGS. 2 and 3, the cam means was illustrated as including a cam member and, to allow additional useful life, a bearing washer surrounding the cam member. The envelope of the cam means in that instance was accordingly the envelope of the bearing washer and it is the outer periphery of the smaller bearing washer which must lie within the outer periphery of the larger bearing washer at all times in order to prevent overlap and possible breakage. It is noted that, regardless of whether the cams include a bearing washer or not, the envelope of the smaller cam means can lie anywhere within the periphery of the larger cam means up to a point of internal tangency. Thus, the cam members illustrated in FIGS. 4 and 5 which are tangent can be used as direct driving elements fitted in appropriately sized blade yokes, or the peripheries of the washers of FIG. 3 could be tangent if desired.

It is an additional feature of this invention to counterbalance the inertial forces of the rotating and reciprocating members. To this end, the gear 66 is provided with an aperture 122 so that the gear will be dynamically balanced when rotating. Similarly, the throw of the second cam means which engages the lighter weight shear bar is greater than the throw of the first cam means which engages the heavier shear bar, the difference in the throws being so selected that when the gear is rotated the inertial forces created by the opposed reciprocation of the blades of differing masses are substantially counterbalanced. In the embodiment shown in FIGS. 4 and 5 the gear means 64 is dynamically balanced by providing an aperture 124 in the intermediate drive member 116.

It is also noted that the present invention has been described in terms of a counter-reciprocating blade system in which the blade masses are different. If the masses of the blades are equal, the cams are placed on the gear face so that the centers 88 and 100 thereof are equally spaced about the center of rotation 76 of the gear. Thus, since the two blades of equal mass are moved equal distances, no imbalance occurs. In this regard, it is noted that the cams in either this system or in the systems illustrated in the drawings are already balanced by the provision of an opening 122 or 124.

The embodiments illustrated above have been directed to the specific instance of a reciprocating drive for a hedge trimmer having two moving blades. It is also noted that this drive mechanism is suitable for adaptation to other constructions such as cultivators or the like in which counter-reciprocating members are to be driven from a rotary source. The advantages set forth above would accrue in a similar manner in these alternative constructions.

While preferred structures in which the principles of the present invention have been incorporated are shown and described above, it is to be understood that the invention is not to be limited to the particular details, as shown and described above, but that, in fact, widely different means may be employed in the practice of the broader aspects of the invention.

What is claimed is:

1. An apparatus for simultaneously imparting relative motion to two juxtapositioned driven members comprising:
   support means;
   first and second driven members having yokes defining cam follower slots, said driven members being carried by said support means for relative movement in a plane with respect to each other with the cam follower slots being held in juxtapositioned relationship with respect to each other;
   drive means rotatable about an axis normal to the plane of relative movement;
   first cam means mounted upon the drive means, the periphery of said first cam means engaging the cam follower slot on the first driven member and operable to impart relative movement to said first driven member upon rotation of the drive means, the axis of rotation of said drive means passing within the periphery of the first cam means; and
   second cam means integral with and laterally off-set from the first cam means, the periphery of said second cam means engaging the cam follower slot on the second driven member and operable to impart relative movement to said second driven member upon rotation of said drive means, the periphery of the second cam means lying within the periphery of the first cam means.

2. The apparatus set forth in claim 1 wherein said driven members have differing masses, said first and second cam means having generally circular peripheries, the axis of one of said cam means being offset from the axis of said drive means a greater amount than the other of said cam means, the axes of said cam means being in line with the axis of said drive means with said drive means axis being interposed between said axes of said cam means, said one cam means engaging the driven member of less mass whereby the inertial forces created by the relative movement of the first and second unbalanced drive members are substantially counterbalanced.

3. The apparatus set forth in claim 1 wherein said driven members have the same mass, said first and second cam means have generally circular peripheries, the distance between the drive means and the axis of one of said cam means being the same as the distance between the axis of the drive means and the other of said cam means, the axes of said cam means being in line with the axis of said drive means with said drive means axis being interposed between said axes of said cam means, whereby unbalanced inertial forces are eliminated.

4. The apparatus set forth in claim 1 wherein said first and second driven members are elongated shear bars, said shear bars being carried by said support means for reciprocal movement about their length, said cam follower slots extending transversely to the length of said shear bars.

5. A portable power tool comprising;
   support means;
   first and second driven members carried by said support means for opposed reciprocal movement, each of said members being provided with a yoke at one end defining a cam follower slot which extends transversely to the direction of reciprocation;
   a drive member rotatable about an axis normal to the plane of reciprocation;
   first circular cam means eccentrically mounted upon the drive member and having a radius in excess of its throw, the periphery of the first cam means engaging the cam follower slot on the first driven member and operable to impart reciprocal movement to said first driven member upon rotation of the drive means; and
   second cam means integral with and laterally off-set from the first cam means and eccentric to said drive member, the maximum distance between the outer periphery of the second cam means and the axis of the drive member being not greater than the difference between the radius of the first cam means and its throw, the periphery of the second cam means engaging the cam follower slot on the second driven member and being operable to impart reciprocal movement to said second driven member upon rotation of the drive means.

6. The portable power tool set forth in claim 5 wherein said first and second driven members are longitudinally extending shear bars, the yoke at the end of one of the shear bars being held in close face-to-face contact with the yoke of the other shear bar.

7. The portable power tool set forth in claim 5 wherein said drive member is a gear having teeth on its outer periphery, said teeth being engaged by the output shaft of a motor mounted within the portable power tool, said first circular cam means including a circular projection formed on one surface of said gear, and said second cam means including a second circular projection extending outwardly from said first circular projection.

* * * * *